United States Patent
Huang et al.

(10) Patent No.: US 7,721,803 B2
(45) Date of Patent: *May 25, 2010

(54) NANO-SIZED PARTICLE-COATED PROPPANTS FOR FORMATION FINES FIXATION IN PROPPANT PACKS

(75) Inventors: Tianping Huang, Spring, TX (US); James B. Crews, Willis, TX (US); John R. Willingham, Cypress, TX (US); James R. Pace, Spring, TX (US); Christopher K. Belcher, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 6 days.

This patent is subject to a terminal disclaimer.

(21) Appl. No.: 11/931,501

(22) Filed: Oct. 31, 2007

(65) Prior Publication Data
US 2009/0107673 A1    Apr. 30, 2009

(51) Int. Cl.
*E21B 43/04*    (2006.01)
*E21B 43/267*    (2006.01)
(52) U.S. Cl. .............. 166/278; 166/276; 166/279; 166/280.2; 166/308.3
(58) Field of Classification Search ............. None
See application file for complete search history.

(56) References Cited

U.S. PATENT DOCUMENTS

| 5,518,996 | A | 5/1996 | Maroy et al. |
|---|---|---|---|
| 7,131,491 | B2 | 11/2006 | Blauch et al. |
| 7,204,311 | B2 | 4/2007 | Welton et al. |
| 7,258,170 | B2 | 8/2007 | Nguyen et al. |
| 2005/0107265 | A1 | 5/2005 | Sullivan et al. |
| 2005/0252658 | A1 | 11/2005 | Willingham et al. |
| 2007/0036977 | A1 | 2/2007 | Sinclair et al. |
| 2007/0066491 | A1 | 3/2007 | Bicerano et al. |
| 2007/0104923 | A1 * | 5/2007 | Whitaker et al. ............. 428/144 |
| 2008/0087429 | A1 * | 4/2008 | Brannon et al. .......... 166/280.1 |
| 2008/0099207 | A1 * | 5/2008 | Venditto et al. .......... 166/308.3 |

FOREIGN PATENT DOCUMENTS

WO    2008036812 A2    3/2008

OTHER PUBLICATIONS

U.S. Appl. No. 11/931,706, filed Oct. 31, 2007, Huang et al.
J. Hibbeler, et al., "An Integrated Long-Term Solution for Migratory Fines Damages," SPE 81017, SPE Latin American and Caribbean Petroleum Engineering Conference, Apr. 27-30, 2003, pp. 1-11, Port-of-Spain, Trinidad, West Indies.
P.D. Nguyen, et al., "Controlling Formation Fines at Their Sources to Maintain Well Productivity," SPE 97659, SPE International Improved Oil Recovery Conference in Asia Pacific, Kuala Lumpur, Dec. 5-6, 2005; republished SPE Production & Operations, May 2007, pp. 202-215.
Y. Taguchi et al., Preparation of find composite particles composed of inorganic solid powders and organic polymers by utilizing liquid-liquid dispersion, Colloids and Surfaces A: Physiochemical and Engineering Aspects, vol. 153, 1999, pp. 401-404 (XP002530896).

* cited by examiner

*Primary Examiner*—Zakiya W. Bates
(74) *Attorney, Agent, or Firm*—Mossman Kumar & Tyler PC

(57) ABSTRACT

A fracturing fluid, gravel pack fluid and/or frac pack fluid containing particles such as proppants, gravel and/or sand, may contain an effective amount of a nano-sized particulate additive to fixate or reduce fines migration, where the particulate additive is an alkaline earth metal oxide, alkaline earth metal hydroxide, alkali metal oxides, alkali metal hydroxides, transition metal oxides, transition metal hydroxides, post-transition metal oxides, post-transition metal hydroxides piezoelectric crystals and pyroelectric crystals. The nano-sized particulate additive is bound to the particles with a coating agent such as an oil. The particle size of the magnesium oxide or other agent may be nanometer scale, which scale may provide unique particle charges that help fixate the formation fines. The carrier fluid used in the treating fluid may be aqueous, brine, alcoholic or hydrocarbon-based.

10 Claims, 3 Drawing Sheets

NANO-SIZED PARTICLE-COATED PROPPANTS FOR FORMATION FINES FIXATION IN PROPPANT PACKS

TECHNICAL FIELD

The present invention relates to methods and compositions for fixating formation fines from migrating during hydrocarbon recovery operations, and more particularly relates, in one non-limiting embodiment, to methods and compositions for fixating formation fines from migrating in proppant packs within subterranean formations during hydrocarbon recovery operations using nano-sized particles.

BACKGROUND

The migration of fines involves the movement of fine clay and/or non-clay particles (e.g. quartz, amorphous silica, feldspars, zeolites, carbonates, salts and micas) or similar materials within a subterranean reservoir formation due to drag and other forces during production of hydrocarbons or water. Fines migration may result from an unconsolidated or inherently unstable formation, or from the use of an incompatible treatment fluid that liberates fine particles. Fines migration may cause the very small particles suspended in the produced fluid to bridge the pore throats near the wellbore, thereby reducing well productivity. Damage created by fines is typically located within a radius of about 3 to 5 feet (about 1 to 2 meters) of the wellbore, and may occur in gravel-pack completions and other operations.

Fines migration is a complex phenomenon governed largely by mineralogy, permeability, salinity and pH changes, as well as drag forces created by flow velocity, turbulence and fluid viscosity, as described in detail in J. Hibbeler, et al., "An Integrated Long-Term Solution for Migratory Fines Damage," SPE 81017, SPE Latin American and Caribbean Petroleum Engineering Conference, Port-of-Spain, Trinidad, West Indies, 27-30 Apr. 2003, incorporated herein by reference in its entirety. The authors note that mobilization of fines can severely damage a well's productivity, and that fines damage is a multi-parameter, complex issue that may be due to one or more of the following downhole phenomena: (1) high flow rates, particularly abrupt changes to flow rates; (2) wettability effects, (3) ion exchange; (4) two-phase flow, particularly due to turbulence that destabilize fines in the near-wellbore region; and (5) acidizing treatments of the wrong type or volume which can cause fines.

J. Hibbeler, et al. note that fines, especially clays, tend to flow depending on their wettability, and since fines are typically water-wet, the introduction of water may trigger fines migration. However, they note that clay particles may become oil-wet or partially oil-wet, due to an outside influence, and thus the fines and clay particles may become attracted to and immersed in the oil phase. The authors also note that all clays have an overall negative charge and that during salinity decrease, pH increases in-situ due to ion exchange. A pH increase may also be induced via an injected fluid. As pH increases, surface potential of fines increases until de-flocculation and detachment occurs, aggravating fines migration.

Fines fixation has become troublesome during oil and gas production and during many oil and gas recovery operations, such as acidizing, fracturing, gravel packing, and secondary and tertiary recovery procedures. Hydraulic fracturing is a method of using pump rate and hydraulic pressure to fracture or crack a subterranean formation. Once the crack or cracks are made, high permeability proppant, relative to the formation permeability, is pumped into the fracture to prop open the crack. When the applied pump rates and pressures are reduced or removed from the formation, the crack or fracture cannot close or heal completely because the high permeability proppant keeps the crack open. The propped crack or fracture provides a high permeability path connecting the producing wellbore to a larger formation area to enhance the production of hydrocarbons.

Gravel packing is a sand-control method employed to prevent the production of formation sand. In gravel pack operations, a steel screen is placed in the wellbore and the surrounding annulus packed with a gravel of a specific size designed to prevent the passage of formation sand. The goal is to stabilize the formation while causing minimal impairment to well productivity. Operations combining fracturing and gravel packing are termed "frac packs".

It would be desirable if methods and/or compositions would be devised to help fix or stabilize fines within a subterranean formation so that their migration is reduced, inhibited or eliminated.

SUMMARY

There is provided, in one form, a method for reducing fines migration within a proppant pack in a subterranean formation that includes introducing into the subterranean formation a fluid that contains a base fluid (which may be an oil base fluid, an aqueous base fluid, or an alcohol base fluid), proppants that are solid round grains placed as a slurry into a hydraulic fracture to form a permeable pack that acts to maintain the conductivity of the fracture after the injection is finished and it closes and an amount of a particulate additive effective to reduce fines migration. The particulate additive may have a mean particle size of 100 nm or less, and may be an alkaline earth metal oxide, alkaline earth metal hydroxide, alkali metal oxide, alkali metal hydroxide, transition metal oxide, transition metal hydroxide, post-transition metal oxide, post-transition metal hydroxide, piezoelectric crystals, pyroelectric crystals, and mixtures thereof. At least a portion of the nano-sized particulate additives are adhered to the proppants with a coating agent that includes an oil that may be the same as or different from the oil base fluid.

There is additionally provided in another non-limiting embodiment a fluid that contains a base fluid (which may be aqueous-based, alcohol-based or oil-based, but is expected to be typically aqueous-based), proppants selected from the group consisting of sand, gravel, ceramic beads, glass beads and combinations thereof, a coating agent which may include an oil that is the same as or different from the base fluid, if the base fluid is oil-based, and an effective amount of a particulate additive to reduce fines migration. The particulate additive may have a mean particle size of 100 nm or less and may be an alkaline earth metal oxide, alkaline earth metal hydroxide, alkali metal oxide, alkali metal hydroxide, transition metal oxide, transition metal hydroxide, post-transition metal oxide, post-transition metal hydroxide, piezoelectric crystals, pyroelectric crystals, and mixtures thereof. Again, at least a portion of the nano-sized particulate additives are coated on the proppants with the coating agent.

There are also provided, in another non-restrictive embodiment, particulate additive-coated proppants that include sand, gravel, ceramic and glass beads, a coating agent at least partially coating the proppants, where the coating agent includes oil, and particulate additives adhered to the proppants with the coating agent. The particulate additive has a mean particle size of 100 nm or less. Again, the particulate additive may be an alkaline earth metal oxide, an alkaline earth metal hydroxide, an alkali metal oxide, an alkali metal hydroxide, a transition metal oxide, a transition metal hydroxide, a post-transition metal oxide, a post-transition metal hydroxide, a piezoelectric crystal, a pyroelectric crystal, and mixtures thereof.

The particulate additives, also referred to herein as nano-sized particles or nanoparticles (e.g. MgO and/or Mg(OH)$_2$, and the like), appear to fixate or flocculate dispersed fines, such as clay and non-clay particles, including charged and non-charged particles. Due to at least in part to their small size, the surface forces (like van der Waals and electrostatic forces) of nanoparticles help them associate, group or flocculate the fines together in larger collections, associations or agglomerations. Such groupings or associations help fix the fines in place and keep them from moving. In many cases, fines fixing ability of the fluids may be improved by use of nano-sized particulate additives that may be much smaller than the pores and pore-throat passages within a hydrocarbon reservoir, thereby being non-pore plugging particles that are less damaging to the reservoir permeability than the fines themselves. This smaller size permits the nanoparticles to readily enter the formation, and then bind up or fix the fines in place so that both the fines and the nanoparticles remain in the formation and do not travel as far—or at least are restrained to the point that damage to the near-wellbore region of the reservoir is minimized.

The addition of alkaline earth metal oxides, such as magnesium oxide; alkaline earth metal hydroxides, such as calcium hydroxide; transition metal oxides, such as titanium oxide and zinc oxide; transition metal hydroxides; post-transition metal oxides, such as aluminum oxide; post-transition metal hydroxides; piezoelectric crystals and/or pyroelectric crystals such as ZnO and AlPO$_4$, to an aqueous fluid, or solvent-based fluid such as glycol, or oil-base fluid which is then introduced into a subterranean formation is expected to prevent or inhibit movement or migration of fines within a subterranean formation or fixate troublesome fines within the proppant pack in the subterranean formation, and maintain the well's productivity for a longer time.

DETAILED DESCRIPTION

Figure 1A:
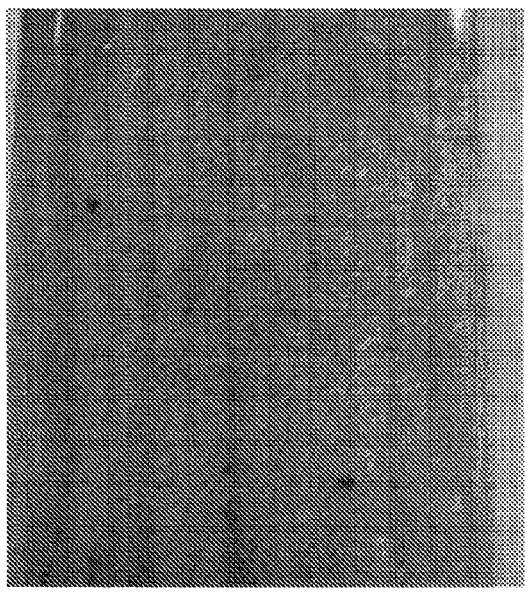
FIG. 1A is a photograph of 20/40 mesh (850/425 micron) sand (proppant) soaked in a mixture of nano-sized MgO particulates and mineral oil to coat the proppant.

Fines fixation has been troublesome during oil and gas production, as well as during many oil and gas recovery operations including, but not necessarily limited to, acidizing, fracturing, gravel packing, secondary and tertiary recovery operations, and the like. As discussed in SPE 81017 referred to above, most of the fines that migrate and cause damage have a charge, and all clay particles generally have an overall negative charge. As defined herein, fines are particles having particle size less than 37 microns (μm).

It has been discovered that nano-sized particles like magnesium oxide (MgO) may be used to fixate formation fines such as clay and quartz in subterranean hydrocarbon formations to inhibit, restrain or prevent them from migrating to near-wellbore regions to choke or damage the production of hydrocarbons. Some nano-sized particles, also called nanoparticles herein, not only have high surface areas compared to their small sizes, but also have relatively high surface charges that permit them to associate or connect other particles together, including other charged particles, but also other non-charged particles. In one non-limiting embodiment, these associations or connections between the fines and the nano-sized particles are due to electrical attractions and other intermolecular forces or effects.

As will be shown, laboratory tests have demonstrated that relatively small amounts of MgO nanoparticles can fixate and flocculate dispersed clay particles, and charged and non-charged colloidal silicas. Other nanoparticles such as ZnO, Al$_2$O$_3$, zirconium dioxide (ZrO$_2$), TiO$_2$, cobalt (II) oxide (CoO), nickel (II) oxide (NiO), and pyroelectric and piezoelectric crystals may also be used in the methods and compositions herein.

The nanoparticles may be pumped with a carrier fluid downhole deep within the formation to fixate fines. Optionally, these nanoparticles may be coated on proppant or sand at the surface or during placement downhole for frac-pack and gravel pack applications to fixate formation fines during these procedures. In one embodiment, a mixture of a coating agent and nanoparticles at least partially coat the selected proppant to fixate formation fines within a proppant pack or other porous media, or inhibit or prevent fines from migrating or moving within the subterranean formation. If gravel is at least partially coated with the coating agent and the nanoparticles, then the formation fines may be fixated within the gravel pack, or may be inhibited from migrating or moving within the subterranean formation.

The base fluid or carrier fluid may be water-based, alcohol-based or oil-based, but in most expected embodiments of the invention is expected to be water-based. Non-limiting examples of suitable water-based fluids include, but are not restricted to, EMERALD FRAQ™ aqueous fluid containing a crosslinked polymer and DIAMOND FRAQ™ aqueous fluid containing a viscoelastic surfactant (VES), both available from Baker Oil Tools. In another non-restrictive version, the carrier fluid may be foamed.

The carrier fluid or aqueous-based fluid may be brine. In non-limiting embodiments, the brines may be prepared using salts including, but not necessarily limited to, NaCl, KCl, CaCl$_2$, MgCl$_2$, NH$_4$Cl, CaBr$_2$, NaBr$_2$, sodium formate, potassium formate, and other commonly used stimulation and completion brine salts. The concentration of the salts to prepare the brines may be from about 0.5% by weight of water up to near saturation for a given salt in fresh water, such as 10%, 20%, 30% and higher percent salt by weight of water. The brine may be a combination of one or more of the mentioned salts, such as a brine prepared using NaCl and CaCl$_2$ or NaCl, CaCl$_2$, and CaBr$_2$ as non-limiting examples.

Suitable coating agents include, but are not necessarily limited to, mineral oil or other hydrocarbon that accomplishes the purposes of the methods and compositions described herein. Specific, non-limiting examples of suitable mineral oils include ConocoPhillips Pure Performance® Base Oil, such as 225N and 600N oils. It is expected that a fines control product will include nanoparticles in the coating agent oil, for instance about 15 wt% nano-sized MgO particles in the 600N mineral oil. This fines control product would be added to an aqueous base fluid in a relatively small amount, in one non-limiting embodiment, from about 5 to about 100 gptg. It has been discovered that during mixing, the fines control product (i.e. the nanoparticles in oil) will plate out on or at least partially coat the particles, such as proppant particles. That is, since the base fluid is aqueous, the hydrophobic oil will be repulsed by the water and will coat the particles (e.g. proppant). How much coating of the particles that occurs is concentration dependant, based on both the amount of proppant used and the amount of fines control product used. In a non-limiting example the fines control product may additionally have a surfactant present, such as an oil-wetting surfactant like sorbitan monooleate (i.e. Span 80 from Uniqema), to improve and/or enhance the oil-wetting of the proppant particles by the fines control product. In another non-limiting example the presence of a surfactant may preferentially reduce the thickness of the 600N mineral oil layer on proppant particles. A reduced oil layer thickness may enhance nanoparticle exposure on proppant particles. Other agents besides Span 80 may be employed to optimize the oil coating or wetting on proppant particles, agents such as: sorbitan esters, ethoxylated sorbitan esters, ethoxylated alcohols, ethoxylated alkyl-phenols, alkyl-dicarboxylics, sulfosuccinates, phospholipids, alkyl-amines, quaternary amines, alkyl-siloxanes, and the like. It is not necessary that a resin be used as a coating agent or binder, and in one non-limiting embodiment, no resin is used.

It is expected that at least a portion of the particles or proppant may be "pre-coated" with the fines control agent, for instance a select portion of the proppant may be pre-coated before the job. For instance, pre-coating may be performed at the manufacturing site of the dry proppant or elsewhere. In one non-restrictive version, the fines control agent may be possibly sprayed onto the dry proppant (or other particles) before the proppant is placed in an aqueous treatment fluid.

Mineral oil as a coating agent for use with the nanoparticles has been found to be suitable for at least two reasons. First, mineral oil and like substances have an affinity to coat particles such as proppant particles as contrasted with remaining as oil droplets containing nanoparticles as a phase internal to the water-based fluid. It appears that the most stable configuration for the fines control agent once placed in an aqueous treatment fluid is to "plate out" or coat or at least partially coat any particles present. The fines control agent has been found to have an affinity to coat evenly onto the particles or proppant when it is placed in an aqueous fluid. Again, the degree of coating is primarily concentration dependent. Second, it has been found that a high molecular weight mineral oil coating agent will not disturb the fluid properties of an aqueous fluid containing a polymer gelling agent or a VES gelling agent, and thus it is an ideal media for depositing the nanoparticles onto the proppant without disturbing aqueous fluid properties.

It is theorized that the nanoparticles remain on the proppant particles primarily by electrostatic and other charges between the nanoparticle and proppant particle surfaces, however, other attractions or coupling forces may exist to initially and over the long-term keep the nanoparticles coated on the proppant particles. The inventors do not want to be limited to any particular theory. It is suspected that in most conditions the oil carrier fluid only assists the initial coating process of the nanoparticles on to the proppant particles. However, other agents can be added to the oil carrier fluid that may further enhance the initial and/or long-term nanoparticle attraction to the quartz, glass, ceramic and the like proppant particles composition. Additionally, the surface of the proppant, or a select amount of proppant, may be treated with agents that may improve the overall attraction of the nanoparticles to the proppant.

Nano-sized particles of alkaline earth metal oxides, alkaline earth metal hydroxides, alkali metal oxides, alkali metal hydroxides, transition metal oxides, transition metal hydroxides, post-transition metal oxides, and post-transition metal hydroxides, piezoelectric crystals, pyroelectric crystals, and mixtures thereof have been discovered to have particular advantages for fixating fines and inhibiting or preventing their undesired migration, rather than allowing them to damage production of the near-wellbore region of the reservoir.

Magnesium oxide particles and powders have been suitably used to fixate fines herein. However, it will be appreciated that although MgO particles are noted throughout the description herein as one representative or suitable type of alkaline earth metal oxide and/or alkaline earth metal hydroxide particle, other alkaline earth metal oxides and/or alkaline earth metal hydroxides and/or transition metal oxides, transition metal hydroxides, post-transition metal oxides, and post-transition metal hydroxides, piezoelectric crystals, pyroelectric crystals, may be used in the methods and compositions herein. Additionally, the alkali metal oxides and/or hydroxides may be used alone or in combination with the alkaline earth metal oxides and hydroxides, and/or together with one or more transition metal oxide, transition metal hydroxide, post-transition metal oxide, post-transition metal hydroxide, piezoelectric crystal, and pyroelectric crystal.

By "post-transition metal" is meant one or more of aluminum, gallium, indium, tin, thallium, lead and bismuth. In another non-limiting embodiment herein, the nano-sized particles are oxides and hydroxides of elements of Groups IA, IIA, IVA, IIB and IIIB of the previous IUPAC American Group notation. These elements include, but are not necessarily limited to, Na, K, Mg, Ca, Ti, Zn and/or Al.

The nano-sized particulate additives herein may also be piezoelectric crystal particles (which include pyroelectric crystal particles). Pyroelectric crystals generate electrical charges when heated and piezoelectric crystals generate electrical charges when squeezed, compressed or pressed.

In one non-limiting embodiment, specific suitable piezoelectric crystal particles may include, but are not necessarily limited to, ZnO, berlinite ($AlPO_4$), lithium tantalate ($LiTaO_3$), gallium orthophosphate ($GaPO_4$), $BaTiO_3$, $SrTiO_3$, PbZrTiO3, $KNbO_3$, $LiNbO_3$, $LiTaO_3$, $BiFeO_3$, sodium tungstate, $Ba_2NaNb_5O_5$, $Pb_2KNb_5O_{15}$, potassium sodium tartrate, tourmaline, topaz and mixtures thereof. The total pyroelectric coefficient of ZnO is $-9.4$ $C/m^2K$. ZnO and these other crystals are generally not water soluble.

In one non-limiting explanation, when the aqueous carrier fluid mixed with very small pyroelectric crystals, such as nano-sized ZnO, is pumped downhole into underground formations that are under high temperature and/or pressure, the pyroelectric crystals are heated and/or pressed and high surface charges are generated. These surface charges permit the crystal particles to associate, link, connect or otherwise relate the formation fines together to fixate them together and also to the surrounding formation surfaces. The association or relation of the fines is thought to be very roughly analogous to the crosslinking of polymer molecules by crosslinkers, in one non-limiting image. No formation damage is expected from the use of the nano-sized particulate additives.

In one non-limiting embodiment, the nano-sized solid particulates and powders useful herein include, but are not necessarily limited to, alkaline earth metal oxides or alkaline earth metal hydroxides, or mixtures thereof. In one non-limiting embodiment, the alkaline earth metal in these additives may include, but are not necessarily limited to, magnesium, calcium, barium, strontium, combinations thereof and the like. In one non-limiting embodiment, MgO may be obtained in high purity of at least 95 wt %, where the balance may be impurities such as $Mg(OH)_2$, CaO, $Ca(OH)_2$, $SiO_2$, $Al_2O_3$, and the like.

In another non-limiting embodiment, the particle size of the additives and agents ranges between about 1 nanometer independently up to about 500 nanometer. In another non-limiting embodiment, the particle size ranges between about 4 nanometers independently up to about 100 nanometer. In another non-restrictive version, the particles may have a mean particle size of about 100 nm or less, alternatively about 90 nm or less, and in another possible version about 50 nm or less, alternatively 40 nm or less.

The amount of nano-sized particles in the carrier fluid may range from about 20 to about 500 pptg (about 2.4 to about 60 kg/1000 liters). Alternatively, the lower threshold of the proportion range may be about 50 pptg (about 6 kg/1000 liters), while the upper threshold of proportion of the particles may independently be about 300 pptg (about 36 kg/1000 liters) pptg.

The nano-sized particles herein may be added to a mineral oil or other hydrocarbon as the carrier fluid—a synergistic combination which also serves to initially coat, or at least partially coat, the nanoparticles to the sand or proppant, which are then pumped into place downhole in a hydraulic frac, frac-pack or gravel pack treatment.

In another non-limiting embodiment, the nano-sized particles coated on proppant or sand herein may be added to an aqueous fluid during a treatment.

In hydraulic fracturing applications, propping agents or proppants are typically added to the base fluid. The propping agents are normally used in concentrations between about 1 to 14 pounds per gallon (120-1700 kg/m$^3$) of fracturing fluid composition, but higher or lower concentrations may be used as the fracture design requires. The proppant, solid particle or gravel may be any solid particulate matter suitable for its intended purpose, for example as a screen or proppant, etc. Suitable materials include, but are not necessarily limited to sand (e.g. quartz sand grains), sintered bauxite, bauxite grains, walnut shell fragments, aluminum pellets, nylon pellets, sized calcium carbonate, other sized salts, glass and/or ceramic beads, and the like, and combinations thereof. These solids may also be used in a fluid loss control application.

While the fluids herein are sometimes described typically herein as having use in fracturing fluids, it is expected that they will find utility in gravel pack fluids, displacement fluids and the like. In the case where the carrier fluid is an acidizing fluid, it also contains an acid. In the case where the carrier fluid is also a gravel pack fluid, the fluid also contains gravel consistent with industry practice.

Laboratory tests have shown that 35 nanometer MgO particles and mineral oil coated on a 20/40 mesh (850/425 micron) sand (proppant) pack can successfully fixate simulated formation fines.

In another non-limiting version, the nanoparticles may be coated on proppant or sand at a proppant supplier facility before a fracturing, frac-pack or gravel pack treatment. In a different non-limiting embodiment, a select portion of the proppant may be lightly coated with mineral oil containing nanoparticles during a treatment, or after a frac-pack or gravel pack treatment, and pump the mineral oil-slurried nanoparticles into the pack. It has been discovered that mineral oil-coated nanoparticles tend to be attached to, adhered to, or bound to the proppant or sand.

The invention will be further described with respect to the following Examples which are not meant to limit the invention, but rather to further illustrate the various embodiments.

EXAMPLES

Example 1

20/40 mesh (850/425 micron) sand (proppant) was soaked in a mixture of nanoparticles (1 ppg 35 nm sized MgO (product #12N-0801 available from Inframat Advance Materials) and 600N mineral oil (available from ConocoPhillips) to coat the 20/40 mesh (850/425 micron) sand with the nanoparticles. The coated sand was then packed in a one-inch (2.54 cm) ID acrylic tube. A 5% KCl solution was pumped through the pack at 2 ml/min for 2 hours. The photograph of FIG. 1A was taken for the sand pack after pumping 5% KCl before simulated fines were flowed through the pack.

Figure 1B:
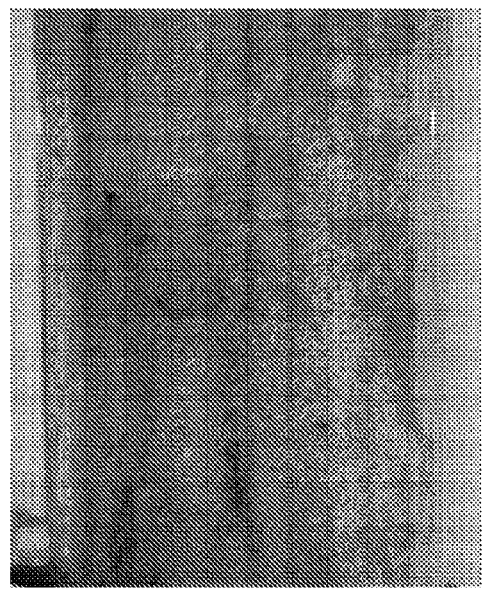
FIG. 1B is a photograph of the 20/40 mesh (850/425 micron) sand of FIG. 1A where simulated formation fines dyed a green color (appearing as a darker gray) fixated in channels by the nano-sized MgO particles.

The simulated formation fines were negatively charged colloidal silica (10% AM anionic sols available from LUDXO Colloidal Silica) and dyed in green color. After first pumping 5% KCl through the sand pack, the simulated formation fines were pumped through the pack at 1 ml/min for 1 hour and then at 2 ml/min for another hour. Then 5% KCl was again pumped at 1 ml/min for 1 hour and 2 ml/min for another hour. After the pumping, the photograph of FIG. 1B was taken. The green channels (which show up as darker gray channels in grayscale) show where the simulated formation fines were fixated by nanoparticles that were coated on the sand.

Example 2

Figure 2:
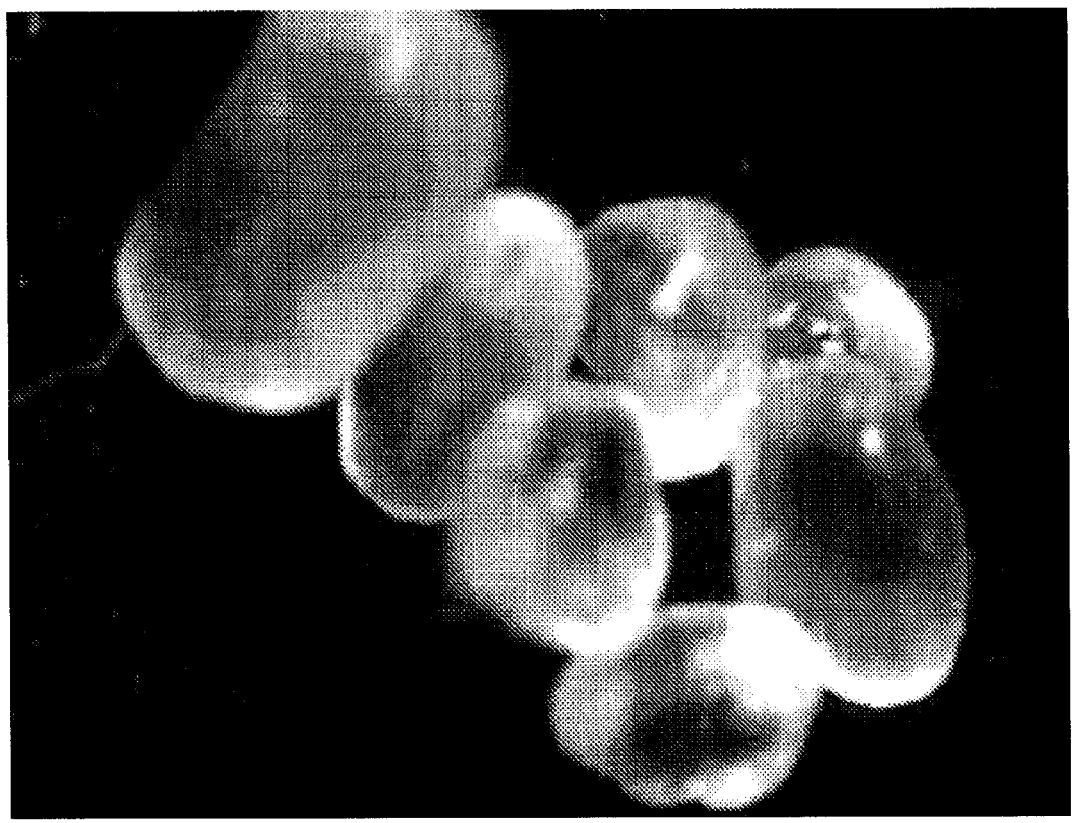
FIG. 2 is a microphotograph (60×) of nanoparticles coating 20/40 mesh (850/425 micron) sand before formation fines were flowed through the sand pack.

The photograph of FIG. 2 was taken at 60 times magnification. It is a microphotograph showing MgO nanoparticles and mineral oil coating 20/40 mesh (850/425 micron) sand before formation fines were flowed through the sand pack.

Example 3

Figure 3:
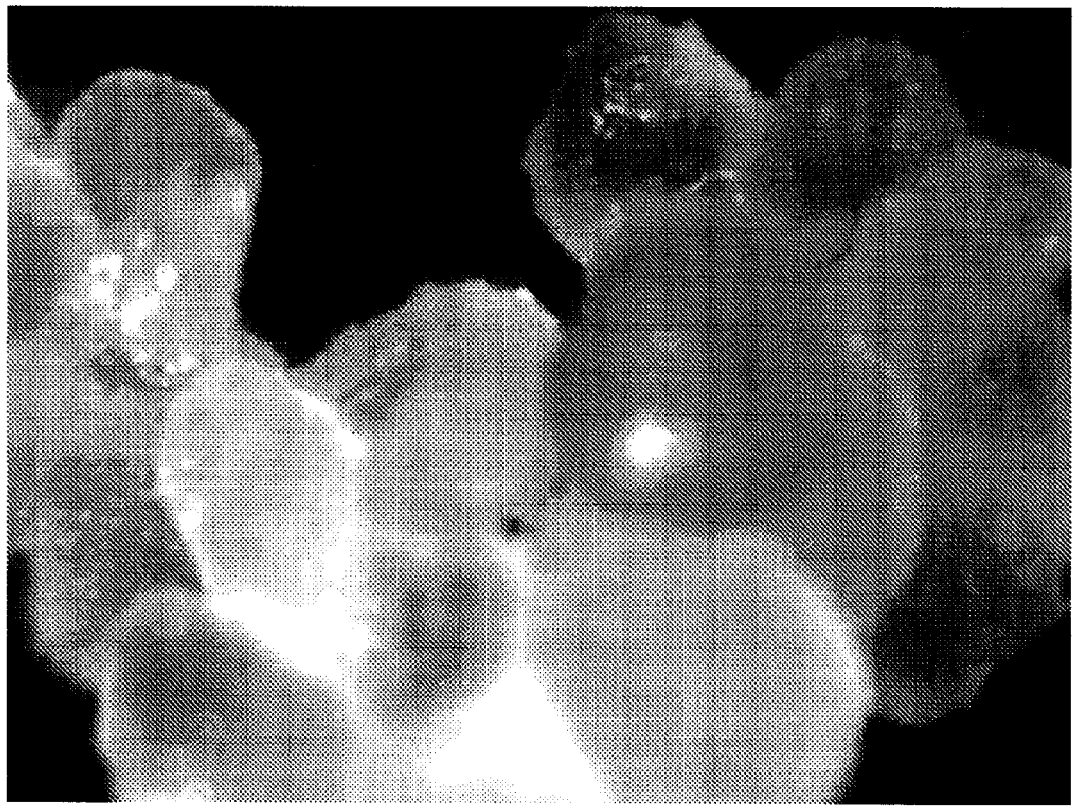
FIG. 3 is a microphotograph (60×) of the 20/40 mesh (850/425 micron) sand of FIG. 2 coated with nanoparticles after formation fines were flowed through the sand pack and 5% KCl flushed the sand pack, showing formation fines fixated on the nanoparticle-coated sand.

The microphotograph of FIG. 3 (also 60×) shows the 20/40 mesh (850/425 micron) sand coated with MgO nanoparticles after the formation fines were flowed through the sand pack, and 5% KCl was flushed through the sand pack. The formation fines are clearly shown as fixated on the nanoparticles-coated sand.

In the foregoing specification, it will be evident that various modifications and changes may be made thereto without departing from the broader spirit or scope of the invention as set forth in the appended claims. Accordingly, the specification is to be regarded in an illustrative rather than a restrictive sense. For example, specific combinations of alkaline earth metal oxides, alkaline earth metal hydroxides, alkali metal oxides, alkali metal hydroxides, transition metal oxides, transition metal hydroxides, post-transition metal oxides, post-transition metal hydroxides, piezoelectric crystals, and pyroelectric crystals, of various sizes; brines; base fluids; proppants (sand, ceramic or glass beads, gravel); coating agents (oils) and other components falling within the claimed parameters, but not specifically identified or tried in a particular composition, are anticipated to be within the scope of this invention.

The words "comprising" and "comprises" as used throughout the claims is to interpreted "including but not limited to".

What is claimed is:

1. A method for reducing fines migration within a particle pack in a subterranean formation comprising introducing into the subterranean formation a fluid comprising:
- a base fluid selected from the group consisting of water-based fluids, alcohol-based fluids and oil-based fluids;
- particles selected from the group consisting of sand, gravel, ceramic beads, glass beads and combinations thereof;
- a coating agent comprising oil, where if the base fluid is oil-based, the oil is the same as or different from the oil-based fluid; and
- an amount of a particulate additive effective to reduce fines migration, the particulate additive
    - having a mean particle size of 100 nm or less,
    - being selected from the group consisting of alkaline earth metal oxides, alkaline earth metal hydroxides, alkali metal oxides, alkali metal hydroxides, transition metal oxides, transition metal hydroxides, post-transition metal oxides, post-transition metal hydroxides, piezoelectric crystals, pyroelectric crystals, and mixtures thereof; and
    - coated on the particles with the coating agent.

2. The method of claim 1 where
- the alkaline earth metal is selected from the group consisting of magnesium, calcium, strontium, and barium,
- the alkali metal is selected from the group consisting of lithium, sodium, potassium,
- the transition metal is selected from the group consisting of titanium and zinc, and
- the post-transition metal is aluminum, and mixtures thereof.

3. The method of claim 1 where the effective amount of the particulate additive ranges from about 20 to about 500 pptg (about 2.4 to about 60 kg/1000 liters) based on the fluid.

4. The method of claim 1 where the fluid is selected from the group consisting of a fracturing fluid, a gravel pack fluid, and a frac pack fluid.

5. The method of claim 1 where the mean particle size of the particulate additive is 90 nm or less.

6. The method of claim 1 where fines migration is reduced as compared to an identical fluid absent the particulate additive.

7. A method for reducing fines migration within a particle pack in a subterranean formation comprising introducing into the subterranean formation a fluid comprising:
- an aqueous base fluid;
- particles selected from the group consisting of sand, gravel, ceramic beads, glass beads, and combinations thereof;
- a coating agent comprising oil; and
- an amount of a particulate additive effective to reduce fines migration, the particulate additive
    - having a mean particle size of 100 nm or less,
    - being selected from the group consisting of alkaline earth metal oxides, alkaline earth metal hydroxides, alkali metal oxides, alkali metal hydroxides, transition metal oxides, transition metal hydroxides, post-transition metal oxides, post-transition metal hydroxides, piezoelectric crystals, pyroelectric crystals, and mixtures thereof;
    - where:
        - the alkaline earth metal is selected from the group consisting of magnesium, calcium, strontium, and barium,
        - the alkali metal is selected from the group consisting of lithium, sodium, and potassium,
        - the transition metal is selected from the group consisting of titanium and zinc, and
        - the post-transition metal is aluminum, piezoelectric crystals, pyroelectric crystals, and mixtures thereof, and
    - coated on the particles with the coating agent.

8. The method of claim 7 where the effective amount of the particulate additive ranges from about 20 to about 500 pptg (about 24 to about 60 kg/1000 liters) based on the fluid.

9. The method of claim 7 where the fluid is selected from the group consisting of a fracturing fluid, a gravel pack fluid, and a frac pack fluid.

10. The method of claim 7 where the mean particle size of the particulate additive is 50 nm or less.

* * * * *